(12) United States Patent
Hayashi

(10) Patent No.: US 7,092,332 B2
(45) Date of Patent: Aug. 15, 2006

(54) OPTICAL DISK AND INFORMATION REPRODUCING APPARATUS

(75) Inventor: Hideki Hayashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 528 days.

(21) Appl. No.: 10/041,473

(22) Filed: Jan. 10, 2002

(65) Prior Publication Data
US 2002/0093892 A1   Jul. 18, 2002

(30) Foreign Application Priority Data
Jan. 12, 2001   (JP)   ............................ P2001-005717

(51) Int. Cl.
*G11B 7/095*   (2006.01)
(52) U.S. Cl. .............................. 369/47.34; 369/47.53; 369/275.3
(58) Field of Classification Search ............ 369/44.34, 369/47.53, 275.3; G11B 7/095, 7/00, 7/024
See application file for complete search history.

(56) References Cited

U.S. PATENT DOCUMENTS

| | | | | |
|---|---|---|---|---|
| 5,235,576 A | * | 8/1993 | Shigemori | 369/30.17 |
| 5,532,988 A | * | 7/1996 | Yokogama | 369/44.28 |
| 5,583,846 A | * | 12/1996 | Yokogawa | 369/275.3 |
| 5,587,992 A | * | 12/1996 | Hayashi | 369/275.4 |
| 5,694,064 A | * | 12/1997 | Watanabe et al. | 327/62 |
| 5,798,996 A | * | 8/1998 | Arai | 369/59.24 |
| 5,914,920 A | * | 6/1999 | Yokogawa | 369/44.26 |
| 6,345,033 B1 | * | 2/2002 | Hayashi | 369/275.4 |
| 6,674,706 B1 | * | 1/2004 | Morioka | 369/59.21 |
| 6,690,629 B1 | * | 2/2004 | Hayashi | 369/44.29 |
| 6,791,917 B1 | * | 9/2004 | Hayashi | 369/44.34 |

FOREIGN PATENT DOCUMENTS

| | | |
|---|---|---|
| JP | 10-74322 | 3/1998 |
| JP | 11-144250 | 5/1999 |

* cited by examiner

*Primary Examiner*—Aristotelis M Psitos
(74) *Attorney, Agent, or Firm*—Drinker Biddle & Reath LLP

(57) ABSTRACT

An optical disk for a sampled servo system is provided with a servo area having a synchronization pit serving as a synchronization reference of reproduction; and a data area having a plurality of data pits which records the digital data and a tracking pit which serves as a tracking reference of the reproduction. The data pits are provided with first data pits and second data pits; and the tracking pit is located between the first and the second data pits. The tracking pit is located at a predetermined position in the data area. A pit row of the plurality of data pits and the tracking pit has the identical pit period. A pit row of the plurality of data pits and the tracking pit has a reverse phase between adjoining two tracks.

10 Claims, 13 Drawing Sheets

FIG. 2
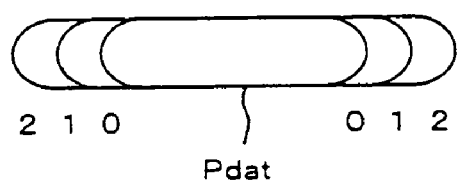
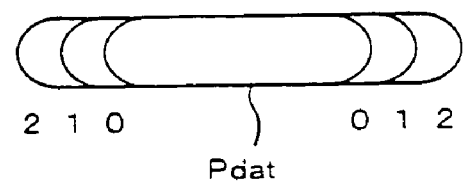

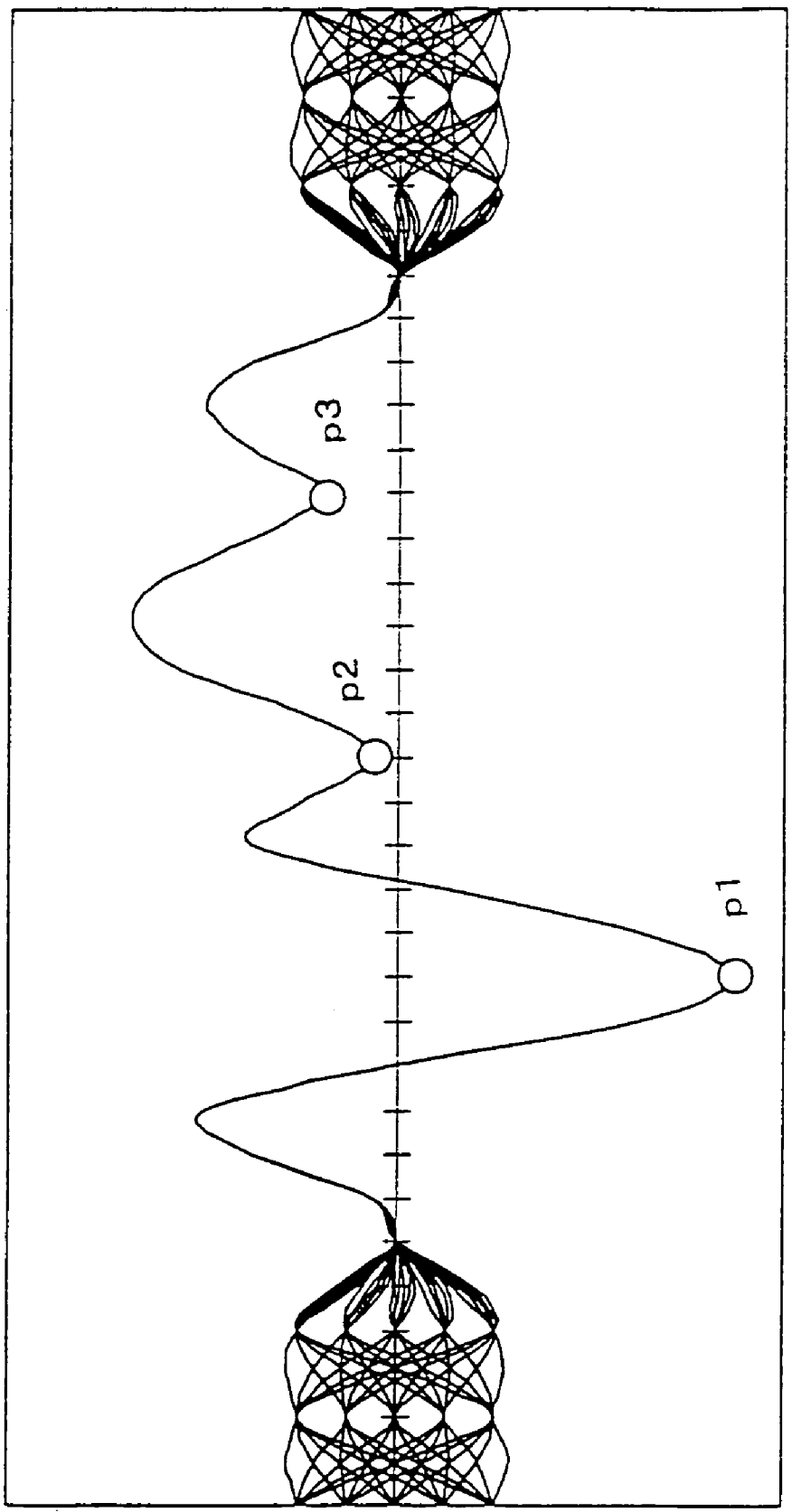

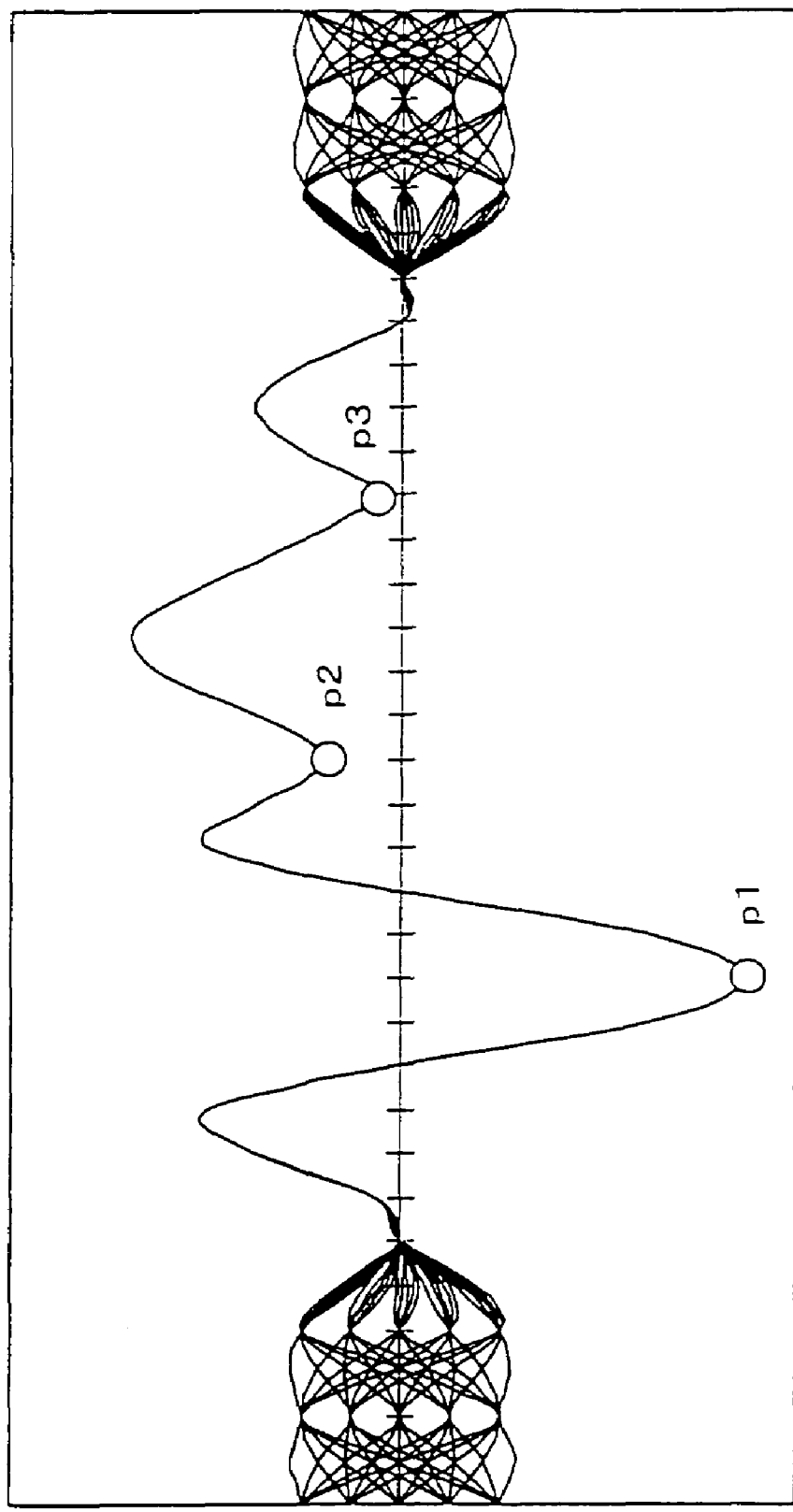

OPTICAL DISK AND INFORMATION REPRODUCING APPARATUS

BACKGROUND OF THE INVENTION

1. Field of the Invention

The present invention relates to a technical art of an optical disk, in which the digital data is recorded. More particularly, the present invention relates to a technical art of an optical disk, in which the digital data is recorded in high density by using a sampled servo system, and an optical disk reproducing apparatus for decoding the digital data from the present optical disk to reproduce it.

2. Description of the Related Art

In recent years, as a system to record and reproduce the digital data in high density in an optical disk, a pit edge multilevel recording system is well known, which records multilevel digital data by modulating a position of a pit edge on an optical disk in multi steps. A system is suggested such that this pit edge multilevel recording system and RPR (Radial Direction Partial Response) reproduction, which is a reproduction signal processing technique employing a partial response method, are combined (for example, it is disclosed in Japanese Patent Application Laid-Open No. 10-74322).

An example of a pit arrangement of an optical disk adopting such a system is shown in FIG. 10. In FIG. 10, on the tracks formed on the optical disk (in FIG. 10, they are denoted by T1 to T8), a synchronization pit Psync, a tracking pit Ptrk, a guard pit Pg and a data pit Pdat are arranged in a line. An area in which the synchronization pit Psync, the tracking pit Ptrk and the guard pit Pg are arranged constitutes a servo area, and an area in which the data pit Pdat is arranged constitutes a data area. In the case of adopting a RPR reproduction system, as shown in FIG. 10, a beam spot BS of a reproduction laser beam to be irradiated on the optical disk traces a centerline of two tracks.

According to the above described constitution, the synchronization pit Psync serves as a synchronization reference in reproduction. A pit length of the synchronization pit Psync is larger than the pit length of the other pits and the synchronization pits Psync are aligned in a disk radial direction so that the optical disk reproducing apparatus can easily detect the synchronization pit Psync. The synchronization pit Psync is also used as a clock phase reference in reproduction.

The tracking pit Ptrk serves as a tracking reference in reproduction. As shown in FIG. 10, the tracking pit Ptrk is provided in an area following the synchronization pit Psync, and the pit position has been changed by four-track period. For tracking servo control by the optical disk reproducing apparatus, reproduction signals of two tracking pits Ptrk located on the adjoining two tracks are used as a reference.

The guard pit Pg prevents the reproduction signals of the servo area and the data area from interfering each other and it is provided on a border between the servo area and the data area.

The data pit Pdat records the digital data by the pit edge multilevel recording system and constitutes a pit row with a given period on the track. Respective data pits Pdat are capable of recording the digital data with three values by changing a position of the pit edge in three steps. In FIG. 10, three positions of the pit edge are shown to be overlapped, but each actual pit edge takes one of three positions.

Next, waveforms of a reproduction signal when the servo area, its preceding area, and its succeeding area are reproduced from the optical disk having a pit position shown in FIG. 10 will be explained. FIG. 11 shows waveforms of a reproduction signal when the reproduction operation has been normally performed. In FIG. 11, waveforms of a reproduction signal are shown when the beam spot BS traces a centerline of a track T4 and a track T5 in FIG. 10. In FIG. 11, a horizontal axis denotes time and a scale in the horizontal axis represents sampling timing of the reproduction signal by a reproduction clock. A vertical direction denotes a reproduction signal level and the horizontal axis represents a center level of the reproduction signal. Additionally, when the beam spot BS reproduces a pit, the reflection light intensity is assumed to be decreased and its reproduction signal level is assumed to be lowered.

As shown in FIG. 11, if the beam spot BS reaches to the servo area to reproduce the synchronization pit Psync, a large negative peak p1 is obtained. Then, the beam spot BS proceeds to reproduce the tracking pit Ptrk of the track T5, a small negative peak p2 is obtained. Then, the beam spot BS proceeds to reproduce the tracking pit Ptrk of the track T4, a small negative peak p3 is obtained. As shown in FIG. 11, the negative peak p2 and the negative peak p3 are in an equal level.

In the tracking servo control in the optical disk reproducing apparatus, the reproduction signal level in accordance with two tracking pits Ptrk, which are located on the adjoining two tracks, is detected and the difference between two levels is detected as a tracking error. Accordingly, a tracking error TE in FIG. 11 is represented as TE=p2−p3=0. Therefore, when the optical disk reproducing apparatus assures normal reproduction operation, the beam spot BS can trace a centerline of two tracks accurately since tracking servo control performs so that the tracking error TE becomes 0.

However, the optical disk reproducing apparatus does not always assure the normal reproduction operation. At first, the inter-symbol interference occurring in the reproduction operation becomes a problem. This inter-symbol interference is signal waveform distortion due to interference among adjoining pits on the track. The inter-symbol interference occurs when an optical property of the optical disk changes in reproduction, a disk surface is blurred or distorted, and a servo error or an electrical property of the optical disk reproducing apparatus changes. Secondly, the sag occurring in the reproduction operation becomes a problem. A HPF (High Pass Filter) is generally provided in an amplifier circuit of a reproduction signal in order to attenuate a low frequency component of the reproduction signal. However, if the reproduction signal from the optical disk has a low frequency component, the HPF distorts the signal waveform, namely, the sag occurs.

FIG. 12 shows waveforms of a reproduction signal when the same area as that shown in FIG. 11 is reproduced. These are waveforms of a reproduction signal in the case that the inter-symbol interference described above occurs in the reproduction operation. The tracking pit Ptrk of the track T5 in FIG. 10 is arranged in the vicinity of the synchronization pit Psync, so that the interference of the synchronization pit Psync becomes stronger. Hereby, the reflection light intensity is decreased on a position of the tracking pit Ptrk, so that the level of the negative peak p2 is lowered. On the other hand, the tracking pit Ptrk of the track T4 in FIG. 10 is located far from the synchronization pit Psync, so that the interference of the synchronization pit Psync becomes weak. Hereby, the reflection light intensity on a position of the tracking pit Ptrk is not influenced, so that the level of the negative peak p3 is not changed. Accordingly, a tracking error TE in FIG. 12 is represented as TE=p2−p3<0.

Next, FIG. 13 shows waveforms of a reproduction signal when the same area as that shown in FIG. 11 is reproduced. These are waveforms of a reproduction signal in the case that the sag is generated in the reproduction operation. Since the pits in the servo area of the optical disk in FIG. 10 are sparser compared to the pits in the data area, an average level of the reproduction signal becomes higher. Therefore, the reproduction signal has a low frequency component equal to the frequency of the servo area, so that the sag is subjected to occur.

In the case that the sag occurs in the reproduction signal, as described above, the waveform is changed with time so that the average level approaches to zero. Accordingly, while the levels of the preceding negative peak p1 and the negative peak p2 are not changed, a level of the negative peak p3 that appears after certain time has passed is lowered. Namely, a tracking error TE in FIG. 13 is represented as TE=p2−p3>0.

As described above, when the waveform of a reproduction signal is distorted by the inter-symbol interference or the sag in the reproduction of the optical disk, the tracking error TE does not become 0 even if the beam spot BS traces a centerline of two tracks. In other words, as described above, if the inter-symbol interference is generated, TE becomes lower than 0, and if the sag is generated, TE becomes higher than 0. If the tracking servo is performed on the basis of the inaccurate tracking error TE in the optical disk reproducing apparatus, the beam spot BS is displaced from the centerline to be traced and so called tracking offset is generated. In this way, according to a conventional system, there is a problem that the tracking servo control becomes inaccurate as a result of the inter-symbol interference and the sag occurring in the reproduction.

SUMMARY OF THE INVENTION

The present invention has been achieved in order to solve the above problems. It is an object of the present invention to provide an optical disk and an optical disk reproducing apparatus to prevent a tracking error signal from being inaccurate depending on the influence by the inter-symbol interference and the sag and perform the accurate tracking servo control in reproducing an optical disk, in which the digital data is recorded by using the sampled servo system.

The above object of the present invention can be achieved by an optical disk for a sampled servo system. The optical disk is provided with a servo area having a synchronization mark for a synchronization signal; and a data area having a plurality of information marks and a tracking mark for a tracking signal.

According to the present invention, there are a servo area and a data area on an optical disk for a sampled servo system. A synchronization mark for a synchronization signal is arranged in the servo area. A plurality of information marks and a tracking mark for a tracking signal are arranged in the data area. Accordingly, the tracking mark is located apart from the servo area, so that it is possible to decrease the influence due to the inter-symbol interference as well as to prevent the sag from occurring due to the low frequency component of the reproduction signal. Therefore, it is possible to prevent the distortion of the signal waveform of the reproduction signal effectively and to detect the accurate tracking error.

In one aspect of the optical disk of the present invention, the information marks comprise first information marks and second information marks; and the tracking mark is located between the first and the second information marks.

According to the present invention, the tracking mark is located in the data area on the optical disk. Accordingly, the tracking mark is located apart from the servo area to be inserted in a mark row of a plurality of information marks, so that it is possible to decrease the influence due to the inter-symbol interference as well as to prevent the sag from occurring due to the low frequency component of the reproduction signal. Therefore, it is possible to prevent the distortion of the signal waveform of the reproduction signal effectively and to detect the accurate tracking error.

In another aspect of the optical disk of the present invention, the tracking mark is located at a predetermined position in the data area.

According to the present invention, the tracking mark is located at a predetermined position in the data area on the optical disk. Therefore, it is possible to set detection timing of a tracking mark in response to the detection timing of information marks with a simple constitution.

As described above, according to an optical disk of the present invention, a mark arrangement around the tracking mark becomes approximately symmetry in a track direction and a large peak does not appear in the reproduction signal. Therefore, it is possible to obtain the accurate tracking error even if the inter-symbol interference occurs, so that the accurate tracking servo control can be performed. Furthermore, the tracking mark formed on the optical disk is arranged with the same period in the mark row of the information marks, so that the reproduction signal does not have a low frequency component. Thus the sag does not occur even if the low frequency component is attenuated. As a result, it is possible to detect the accurate tracking error and to perform the accurate tracking servo control.

In further aspect of the optical disk of the present invention, a mark row of the plurality of information marks and the tracking mark has the identical mark period.

According to the present invention, the plurality of information marks and the tracking mark constitute a mark row having the identical pit period. Therefore, in addition to the effect of the invention set forth in the first aspect, it is possible to set detection timing of a tracking mark in response to the detection timing of a plurality of information marks with a simple constitution.

In further aspect of the optical disk of the present invention, a mark row of the plurality of information marks and the tracking mark has a reverse phase between adjoining two tracks.

According to the present invention, the plurality of information marks and the tracking mark constitute a mark row, which has a reverse phase between the adjoining two tracks. Therefore, in addition to the effect of the invention set forth in the second aspect, it is possible to detect the tracking error easily from the tracking marks, which are arranged in the adjoining two tracks.

In further aspect of the optical disk of the present invention, a mark edge position of the plurality of information marks is changed in multi steps in response to information data; and a mark edge position of the tracking mark is fixed.

According to the present invention, a period of the tracking mark is equal to a period of the information marks and a mark length of the tracking mark is equal to a center value of a mark length of the information marks, so that a shape of the tracking mark and a shape of the information marks are even. As a result, the reproduction signal is not distorted by the inter-symbol interference and the sag.

In further aspect of the optical disk of the present invention, the tracking mark is arranged apart from a border between the servo area and the data area at an interval equivalent to a certain number of the plurality of information marks.

According to the present invention, the tracking mark can assure a certain distance apart from the servo area. Therefore, it is possible to suppress the inter-symbol interference by the synchronization mark sufficiently.

The above object of the present invention can be achieved by an information reproducing apparatus for reproducing information from an optical disk, which comprises a servo area having a synchronization mark for a synchronization signal and a data area having a plurality of information marks and a tracking mark for a tracking signal. The information reproducing apparatus is provided with: a reading device which irradiates a reproduction laser beam to the optical disk and generates a reproduction signal in response to intensity of reflection light from a beam spot on the optical disk; an A/D converting device which samples the reproduction signal in synchronization with a reproduction clock and converts it into a sample series; a tracking error detecting device which extracts a plurality of samples corresponding to the tracking mark from the sample series and detects a tracking error; and a tracking servo device which controls the beam spot so that it scans a centerline of adjoining two tracks in response to the tracking error.

According to the present invention, in order to reproduce the above described optical disk, an information reproducing apparatus is provided with a reading device, an A/D converting device, a tracking error detecting device and a tracking servo device. Then, for performing the tracking servo control in the reproduction, a tracking error is detected as the beam spot traces a centerline of the adjoining two tracks. Accordingly, extracting samples at timing in response to the tracking marks apart from the servo area, it is possible to improve performance of the tracking servo control by detecting the accurate tracking error as described above.

In this way, according to an information reproducing apparatus of the present invention, it is possible to perform the accurate tracking servo control by detecting the accurate tracking error with simple constitution from the optical disk described above.

In one aspect of the information reproducing apparatus of the present invention, the information reproducing apparatus is further provided with: the tracking error detecting device which extracts two samples corresponding to a center of respective tracking marks of the adjoining two tracks and detects a level difference of the two samples as the tracking error.

According to the present invention, for tracing a centerline of the adjoining two tracks, two samples are extracted at timing of a center of respective marks of one track and another track, so that in addition to the effect of the invention according to the aforementioned information reproducing apparatus, it is possible to detect tracking error by simple constitution.

BRIEF DESCRIPTION OF THE DRAWINGS

FIG. 2 is a diagram for explaining the change of pit edge positions of three values in a pit edge multilevel recording system;

FIG. 12 shows waveforms of a reproduction signal in the case that inter-symbol interference is generated in the reproduction operation when the servo area and the front and the rear areas thereof are reproduced from the conventional optical disk; and FIG. 13 shows waveforms of a reproduction signal in the case that the sag occurs in the reproduction operation when the servo area and the front and the rear areas thereof are reproduced from the conventional optical disk.

DETAILED DESCRIPTION OF THE INVENTION

Preferable embodiments of the present invention will be explained with reference to the drawings below. According to the present embodiment, as an example of a sampled servo system, a case is explained that the present invention is applied to an optical disk and an optical disk reproducing apparatus as an information reproducing apparatus adopting a system combining the above described pit edge multilevel recording system and the RPR reproduction.

Figure 1:
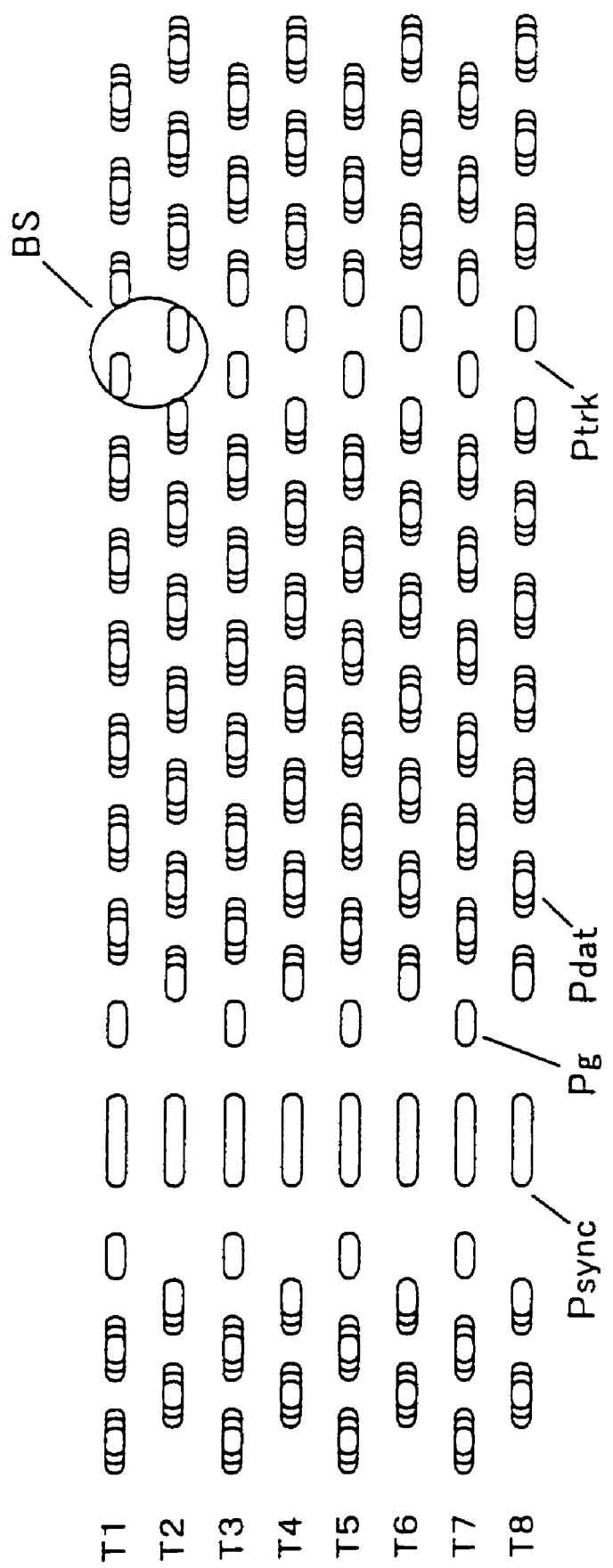
FIG. 1 is a diagram showing a pit arrangement of an optical disk according to the present embodiment.
Figure 10:
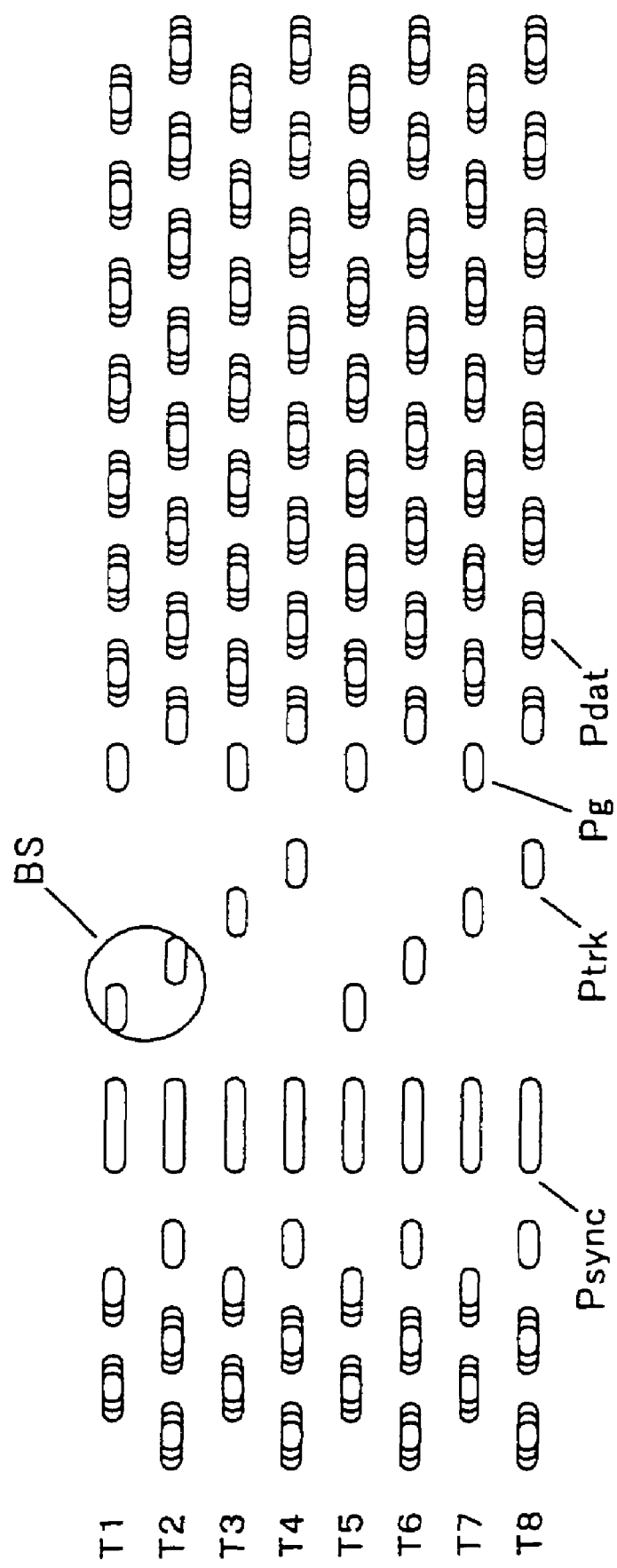
FIG. 10 shows a pit arrangement of a conventional optical disk.
Figure 11:
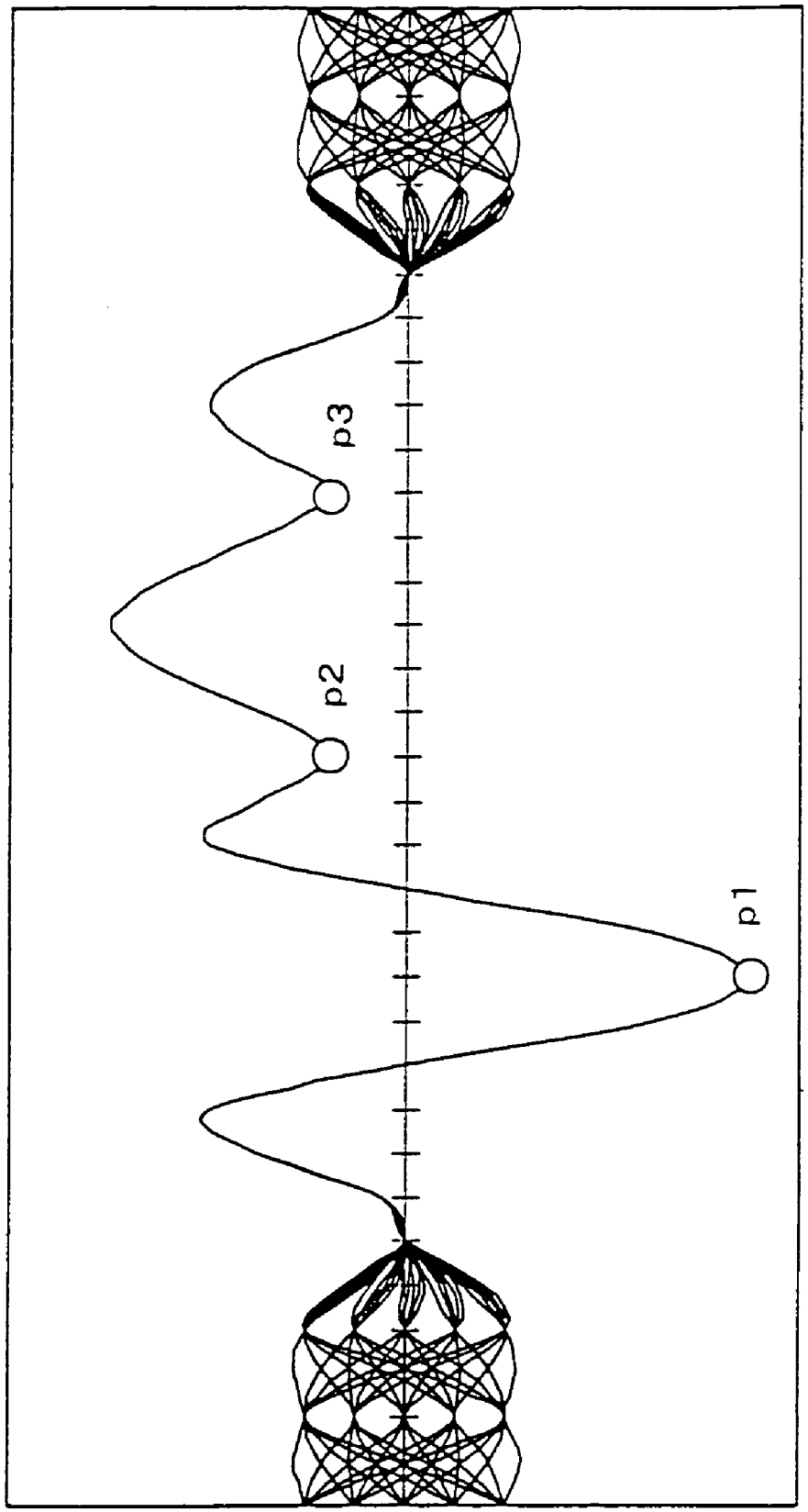
FIG. 11 shows waveforms of a reproduction signal in the case that the reproduction operation has been performed accurately when the servo area and the front and the rear areas thereof are reproduced from the conventional optical disk.

FIG. 1 is a diagram showing a pit arrangement of an optical disk according to the present embodiment. The same as FIG. 10, FIG. 1 shows a pit arrangement of an optical disk in the range of eight tracks T1 to T8. On respective tracks of the optical disk shown in FIG. 1, a synchronization pit Psync, a guard pit Pg, a data pit Pdat and a tracking pit Ptrk are arranged in line. In this case, a synchronization area as a servo area is constituted by the synchronization pit Psync as a synchronization mark for a synchronization signal and the guard pit Pg, and a data area is constituted by a plurality of data pits Pdat as information marks and the tracking pit Ptrk as a tracking mark for a tracking signal.

According to the above described configuration, the synchronization pit Psync serves as a synchronization reference in reproduction. A pit length of the synchronization pit Psync is relatively longer than a pit length of the other pits and the synchronization pits Psync are aligned in a disk radial direction so that an optical disk reproducing apparatus can easily detect it. Additionally, the synchronization pit Psync is also used as a clock phase reference in reproduction.

The guard pit Pg prevents the reproduction signals of the synchronization area and the reproduction signals of the data area from interfering each other and it is provided on a border between the synchronization area and the data area.

The data pit Pdat records the digital data by the pit edge multilevel recording system and constitutes a pit row with a certain period on the track. Respective data pits Pdat are capable of recording the digital data with three values by changing a position of the pit edge in three steps.

Specifically, FIG. 2 shows the case of recording the digital data of three values (0, 1, 2). If the value is "0", a position of a pit edge is shifted by a certain distance in a direction that the pit length becomes shorter. If the value is "1", a position of a pit edge stays as it is. If the value is "2", a position of a pit edge is shifted by a certain distance in a direction that the pit length becomes longer. In this way, on respective pit edges of data pits Pdat, it is possible to record the three value digital data as the positional information of the pit edge. In FIG. 2, three positions of the pit edge are shown to be overlapped, but each actual pit edge takes one of three positions.

As shown in FIG. 1, the above described data pit Pdat has a reverse phase between the adjoining two tracks. In this case, the pits are arranged with alternation arrangement in which the pit position varies with a period of two tracks. Such an alternation arrangement of the data pit Pdat restrains increase and decrease of the pit area in the beam spot BS in response to its movement, so that the variation of the reproduction signal is decreased and the reproduction signal becomes robust against timing offset and jitters.

The tracking pit Ptrk serves as a tracking reference in reproduction. As shown in FIG. 1, the tracking pits Ptrk are arranged in a data area comprising of a plurality of data pits Pdat, such as the first data pits as the first information marks and the second data pits as the second information marks. Accordingly, a pit row as a mark row comprising of the data pit Pdat and the tracking pit Ptrk has a reverse phase between the adjoining two tracks, so that the tracking pits Ptrk are displaced between the two tracks. For the tracking servo control by the optical disk reproducing apparatus, the reproduction signal of two tracking pits Ptrk located on the adjoining two tracks is used as a reference.

According to the optical disk shown in FIG. 1, a pit row comprising of the data pit Pdat and the tracking pit Ptrk has a certain pit period. While the pit edge position as a mark edge position of the data pit Pdat is changed in response to the digital data, the pit edge position of the tracking pit Ptrk is fixed. According to an example shown in FIG. 1, the pit edge position of the tracking pit Ptrk is the same as the pit edge position of the data pit Pdat when the digital data of (1, 1) is recorded on two pit edges of the data pit Pdat.

Figure 3:
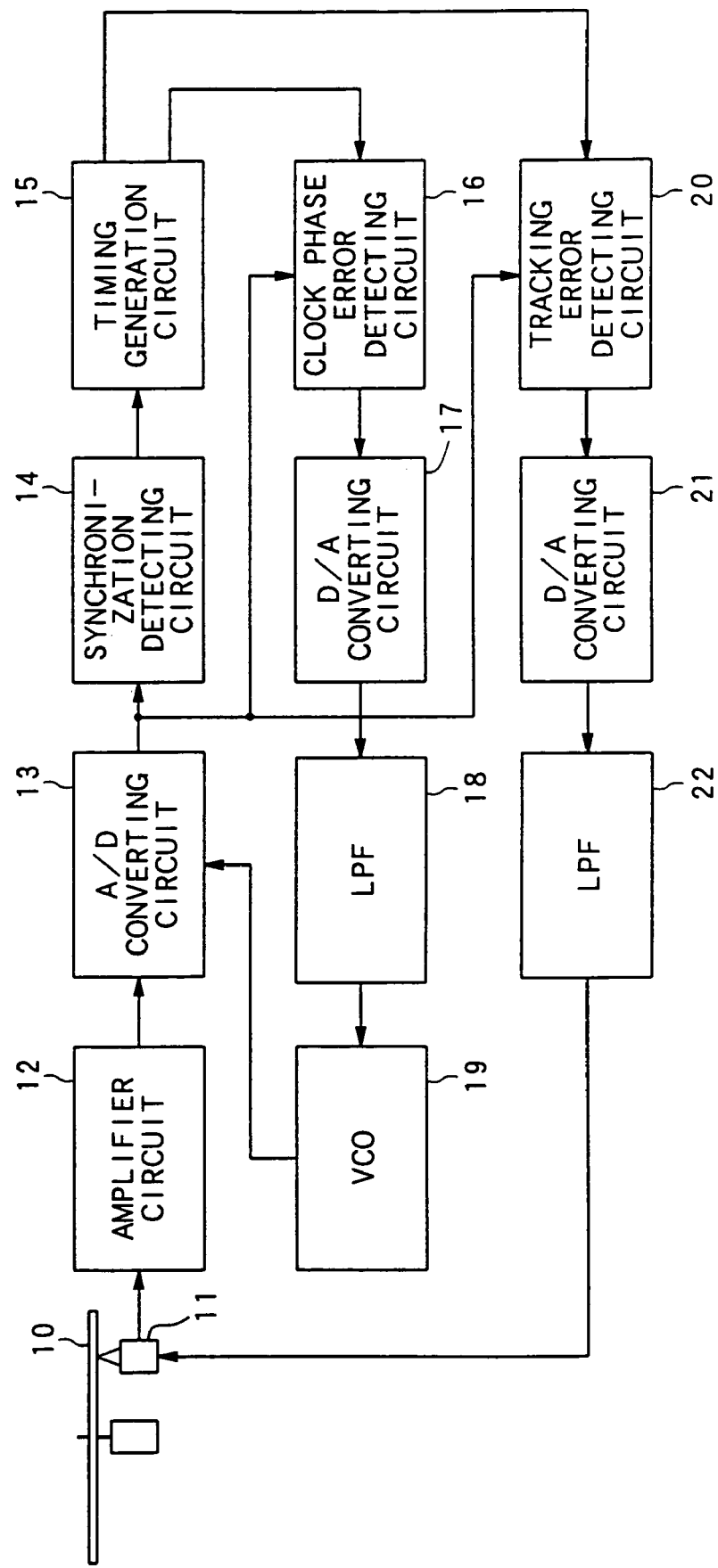
FIG. 3 is a block diagram showing a schematic constitution of an optical disk reproducing apparatus according to the present embodiment.

FIG. 3 is a block diagram showing a schematic constitution of an optical disk reproducing apparatus as an information reproducing apparatus according to the present embodiment. In order to reproduce the digital data, which is recorded on an optical disk 10, the optical disk reproducing apparatus shown in FIG. 3 is constituted by a pick up 11 as a reading device and as a tracking servo device, an amplifier circuit 12, an A/D converting circuit 13 as an A/D converting device, a synchronization detecting circuit 14, a timing generation circuit 15, a clock phase error detecting circuit 16, a D/A converting circuit 17, an LPF 18, a VCO 19, a tracking error detecting circuit 20 as a tracking error detecting device, a D/A converting circuit 21 and an LPF 22.

In the above described constitution, a reproduction laser beam is irradiated to the installed optical disk 10 from a pick up 11 and the reflection light is photoelectrically converted by the pick up 11, so that the reproduction signal is outputted. After being amplified by the amplifier circuit 12, this reproduction signal is sampled in accordance with a reproduction clock by the A/D converting circuit 13 and a sample series is outputted.

The synchronization detecting circuit 14 detects a sample corresponding to the synchronization pit Psync from the sample series and outputs the synchronization detection signal which serves as the synchronization reference. The timing generation circuit 15 generates various timing signals by using the synchronization detection signal outputted from the synchronization detecting circuit 14 as a time reference, and provides these timing signals to respective parts of the optical disk reproducing apparatus.

Next, the clock phase error detecting circuit 16 extracts two samples corresponding to two pit edges of the synchronization pit Psync from the sample series in response to the timing signal from the timing generation circuit 15. Then, the level difference between these two samples is calculated to be outputted as the phase error data. After this phase error data is converted to an analog phase error signal by the D/A converting circuit 17, a waveform of the phase error signal is smoothed by the LPF 18.

The VCO (Voltage Controlled Oscillator) 19 changes an oscillation frequency of a clock with the phase error signal outputted from the LPF 18, so that it generates a reproduction clock, of which phase is synchronized with the phase of the reproduction signal. Then, this reproduction clock is supplied to the A/D converting circuit 13. In this way, a PLL (Phase Locked Loop) is constituted by the A/D converting circuit 13, the clock phase error detecting circuit 16, the D/A converting circuit 17, the LPF 18 and the VCO 19. This PLL comprises a servo loop serving to synchronize the phase of the reproduction clock with the phase of the reproduction signal.

Next, the tracking error detecting circuit 20 extracts two samples corresponding to the positions of two tracking pits Ptrk from the sample series in response to a timing signal from the timing generation circuit 15. Then, it calculates the level difference between these two samples and outputs this level difference as the tracking error data. After this tracking error data is converted to an analog tracking error signal by the D/A converting circuit 21, a waveform of the tracking error signal is smoothed by the LPF 22.

The pick up 11 controls a position of the beam spot BS of the reproduction laser beam in a disk radial direction in response to the tracking error signal, which is outputted from the LPF 22. In the constitution shown in FIG. 3, a tracking servo loop is comprised of the amplifier circuit 12, the A/D converting circuit 13, the tracking error detecting circuit 20, the D/A converting circuit 21, the LPF 22 and the pick up 11. This tracking servo loop allows the beam spot BS to trace a centerline of two tracks.

In the optical disk reproducing apparatus shown in FIG. 3, a period of the reproduction clock is set to ¼ of the period of the pit row. In other words, the frequency of the reproduction clock is four times as high as the frequency of the pit row. In this case, in one pit cycle comprising one pit and one space (an unrecorded portion between pits on a track), A/D converting circuit 13 carries out the A/D conversion four times with the reproduction clock so as to obtain four samples. These four samples correspond to four positions such as a front edge, a pit central portion, a rear edge and a space central portion on the track, respectively.

Figure 4A:
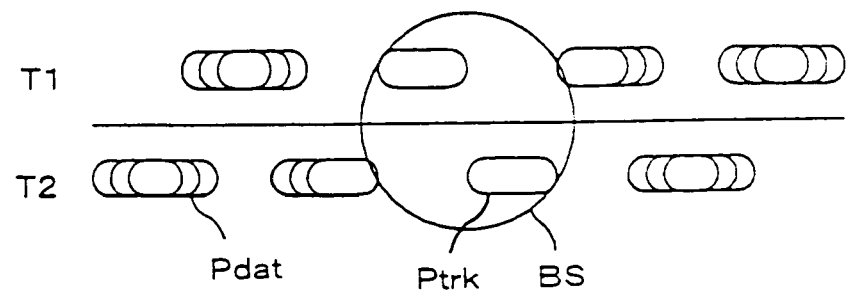
FIGS. 4A–4C are a diagram showing a relation between a pit row and a beam spot in the case of reproducing a tracking area and the front and rear areas thereof on the optical disk according to the present invention.
Figure 4B:
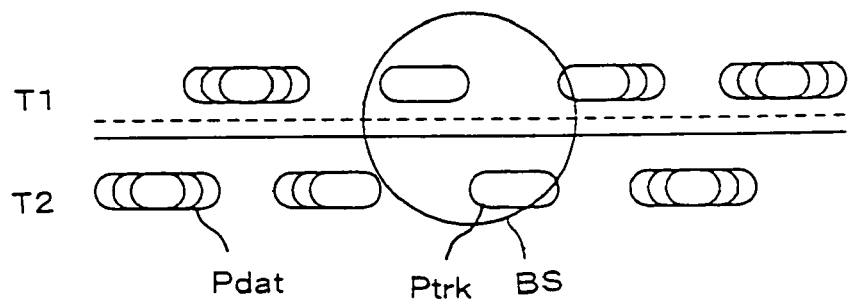
Figure 4C:
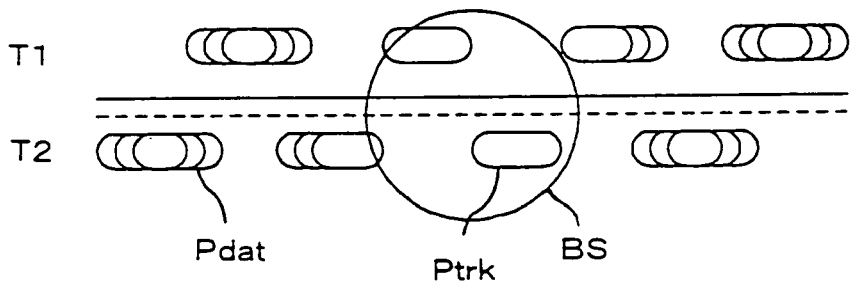
Figure 5:
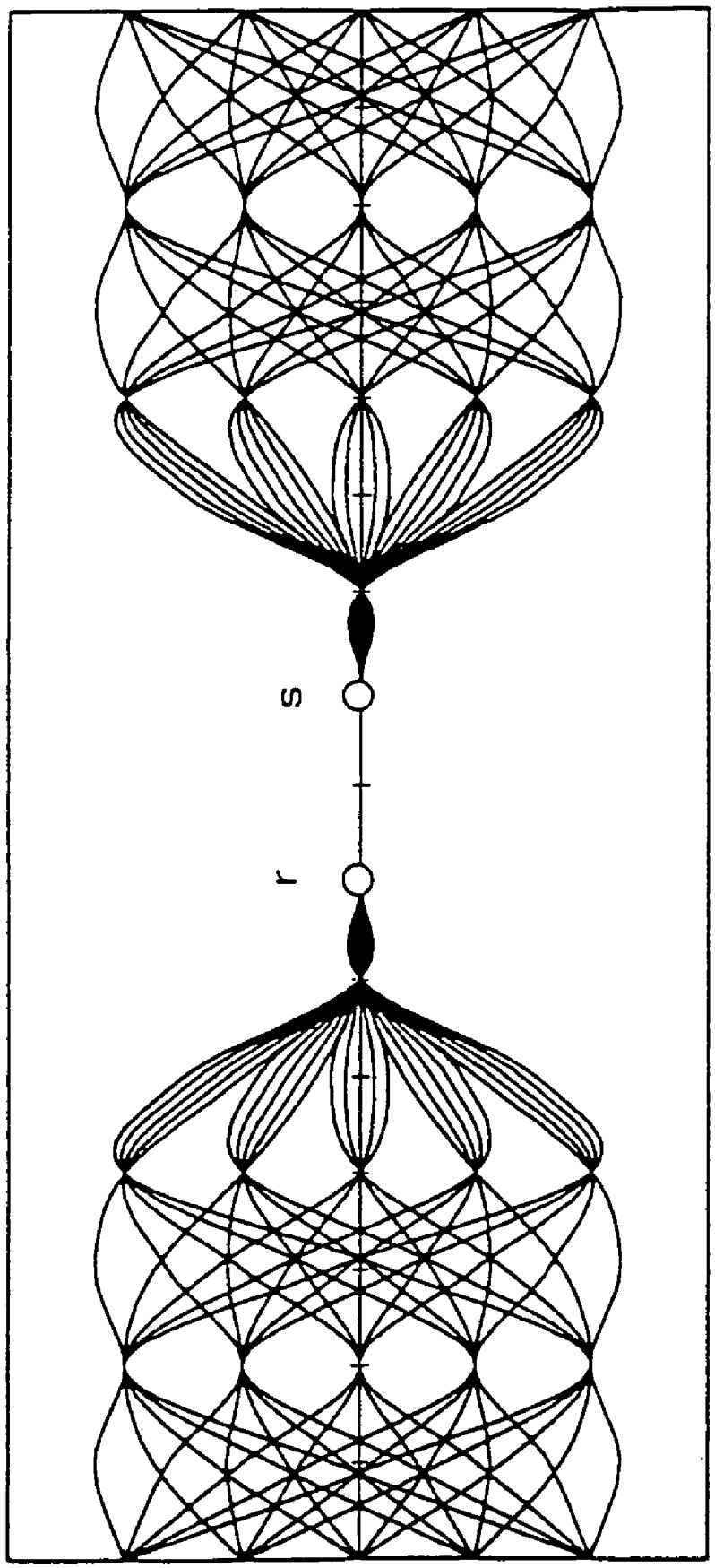
FIG. 5 shows waveforms of a reproduction signal in the case that a beam spot accurately traces a centerline of two tracks.
Figure 6:
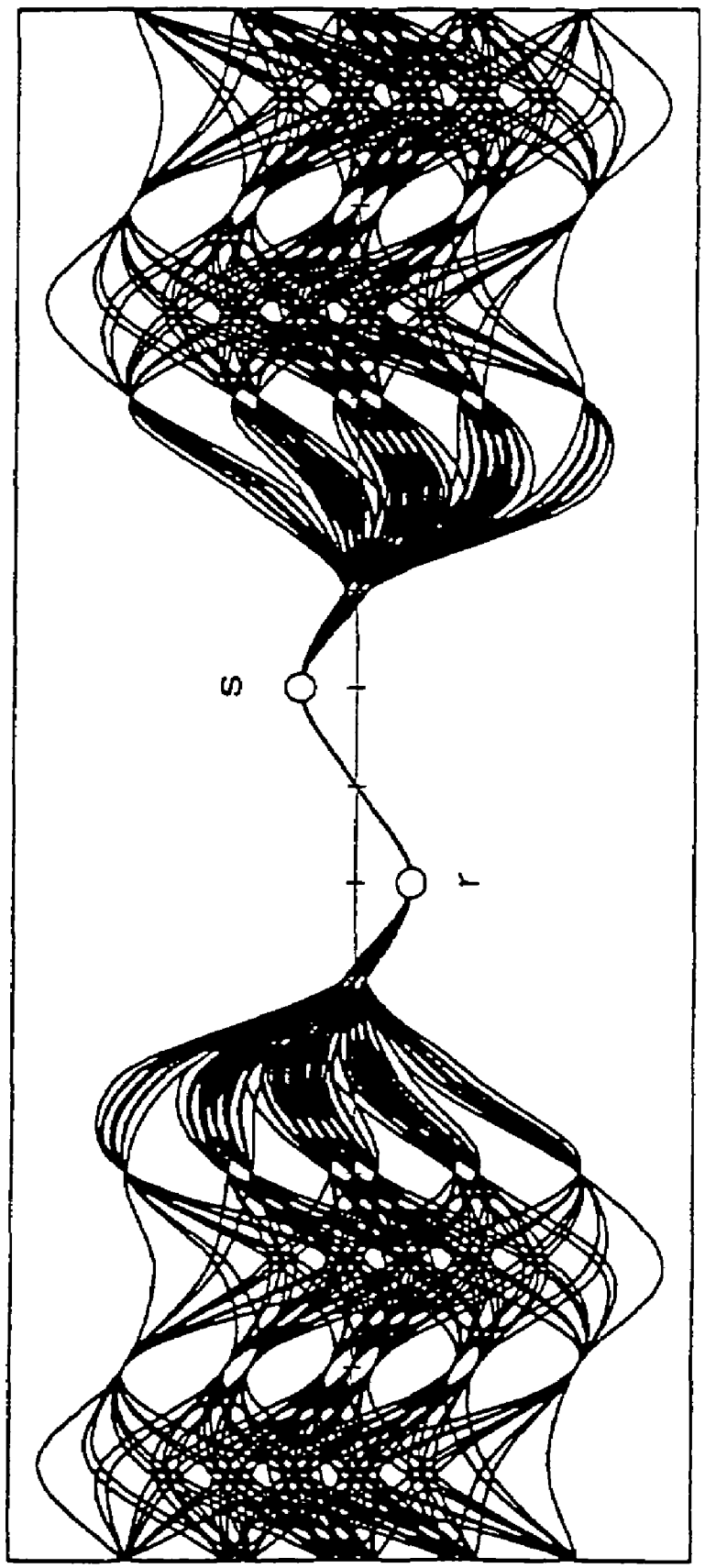
FIG. 6 is waveforms of a reproduction signal in the case that the beam spot traces a line deviated from a centerline of two tracks upward.
Figure 7:
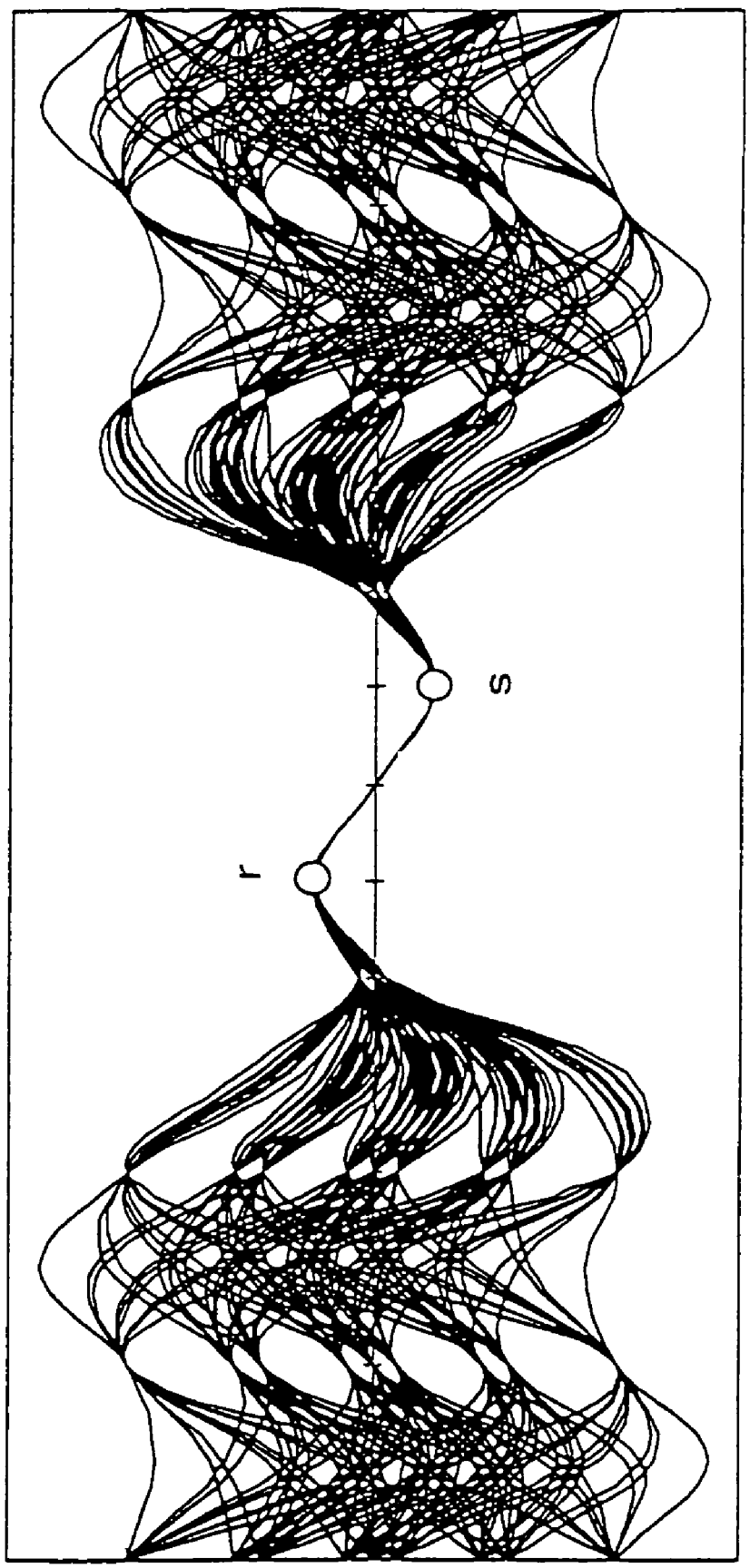
FIG. 7 is waveforms of a reproduction signal in the case that the beam spot traces a line deviated from a centerline of two tracks downward.

Next, a tracking servo control will be explained in reproducing an optical disk according to the present embodiment with reference to FIGS. 4 to 7. FIGS. 4A–4C are a diagram showing a relation between a pit row and a beam spot in the case of reproducing a tracking area of the optical disk and the front and the rear areas thereof. FIGS. 5 to 7 show waveforms of a reproduction signal around the tracking pit (namely, a range of two tracks such as a track T1 and a track T2), respectively, in response to a radial position of the beam spot BS. In this case, in FIGS. 5 to 7, a horizontal axis denotes time and a scale in the horizontal axis represents sampling timing of the reproduction signal by a reproduction clock. A vertical direction denotes a reproduction signal level and the horizontal axis represents a center level of the reproduction signal. Additionally, when the beam spot BS reproduces a pit, the reflection light intensity is assumed to be decreased, and that the level of the reproduction signal is assumed to be lowered.

FIG. 4A shows a case that the beam spot BS accurately traces a centerline of the track T1 and the track T2. In this case, a center of the beam spot BS traces a solid line of FIG. 4A. The beam spot BS is irradiated to the track T1 and the track T2 evenly, so that the intensity of the reflection light from two tracks is equal.

FIG. 5 shows waveforms of a reproduction signal under a condition of FIG. 4A. As shown in FIG. 5, the waveform of the reproduction signal is flat on the tracking pit. In this case, in FIG. 5, the levels of a sample "r" corresponding to a center of the tracking pit Ptrk on the track T1 and a sample "s" corresponding to a center of the tracking pit Ptrk on the track T2 are denoted by a white circle, respectively. These sample "r" and the sample "s" have the same level. Then, the level difference between the sample "r" and the sample "s" is detected as a tracking error TE. The tracking error TE in the case of FIG. 5 is represented as TE=r−s=0.

Next, FIG. 4B shows a case that the beam spot BS traces a line deviated from a centerline of the track T1 and the track T2 upward. In this case, a center of the beam spot BS traces a broken line of FIG. 4B. In the beam spot BS, more light intensity is irradiated to the track T1 than the track T2, so that its reflection light intensity relatively reflects the pit row of the track T1 stronger.

FIG. 6 shows waveforms of a reproduction signal under a condition of FIG. 4B. As shown in FIG. 6, the waveform of the reproduction signal changes in a sine wave on the tracking pit. In FIG. 6, the levels of the sample "r" and the sample "s" are also denoted by a white circle, respectively. Further, it is found that the level difference is generated between the sample "r" and the sample "s". As described above, the reflection light intensity of the beam spot BS is more influenced by the tracking pit Ptrk on the track T1, so that the level of the sample "r" becomes lower than the level of the sample "s". Accordingly, the tracking error TE in the case of FIG. 6 is represented as TE=r−s<0.

Next, FIG. 4C shows a case that the beam spot BS traces a line deviated from a centerline of the track T1 and the track T2 downward. In this case, a center of the beam spot BS traces a broken line in FIG. 4C. In the beam spot BS, more light intensity is irradiated to the track T2 than the track T1, so that its reflection light intensity relatively reflects the pit row of the track T2 stronger.

FIG. 7 shows waveforms of a reproduction signal under a condition of FIG. 4C. As shown in FIG. 7, the waveform of the reproduction signal changes in a sine wave on the tracking pit. In FIG. 7, the levels of the sample "r" and the sample "s" are also denoted by a white circle, respectively. Further, it is found that the level difference is generated between the sample "r" and the sample "s". As described above, the reflection light intensity of the beam spot BS is more influenced by the tracking pit Ptrk on the track T2, so that the level of the sample "s" becomes lower than the level of the sample "r". Accordingly, the tracking error TE in the case of FIG. 7 is represented as TE=r−s>0.

Here, the examples shown in FIG. 6 and FIG. 7 correspond to the case that the beam spot BS traces a line between the track T1 and the track T2. On the other hand, when the beam spot BS traces a line between the track T2 and the track T3, the pit arrangement of two tracking pits Ptrk is reversed, so that a relation between a direction of the tracking offset and a polarity of the tracking error is also reversed. In this case, the tracking error detecting circuit 20 may control the tracking error so that a polarity of the tracking error is reversed in response to a pit arrangement of two tracks which are traced.

As described above, according to the present embodiment, if the beam spot BS traces a line deviated from a centerline of the two tracks, a tracking error in response to the tracking offset is obtained. The tracking servo loop corrects the tracking offset by feeding back this tracking error to the pick up 11 through the D/A converting circuit 21 and the LPF 22, so that it is possible to perform the tracking servo control accurately.

Since the tracking pit is provided apart from the servo area, the reproduction signal is almost symmetry in a track direction and a large peak does not appear in the reproduction signal, as shown in FIGS. 5 to 7. Therefore, it is possible to obtain the accurate tracking error even if the inter-symbol interference occurs.

Additionally, since the tracking pit Ptrk is arranged in the same way as the pit row of the data pit Pdat, an average level of the reproduction signal is almost flat in the vicinity of the tracking pit as shown in FIGS. 5 to 7 and the reproduction signal does not have a low frequency component. Accordingly, the sag does not occur even if the low frequency component is attenuated. As a result, it is possible to obtain the accurate tracking error.

Figure 8:
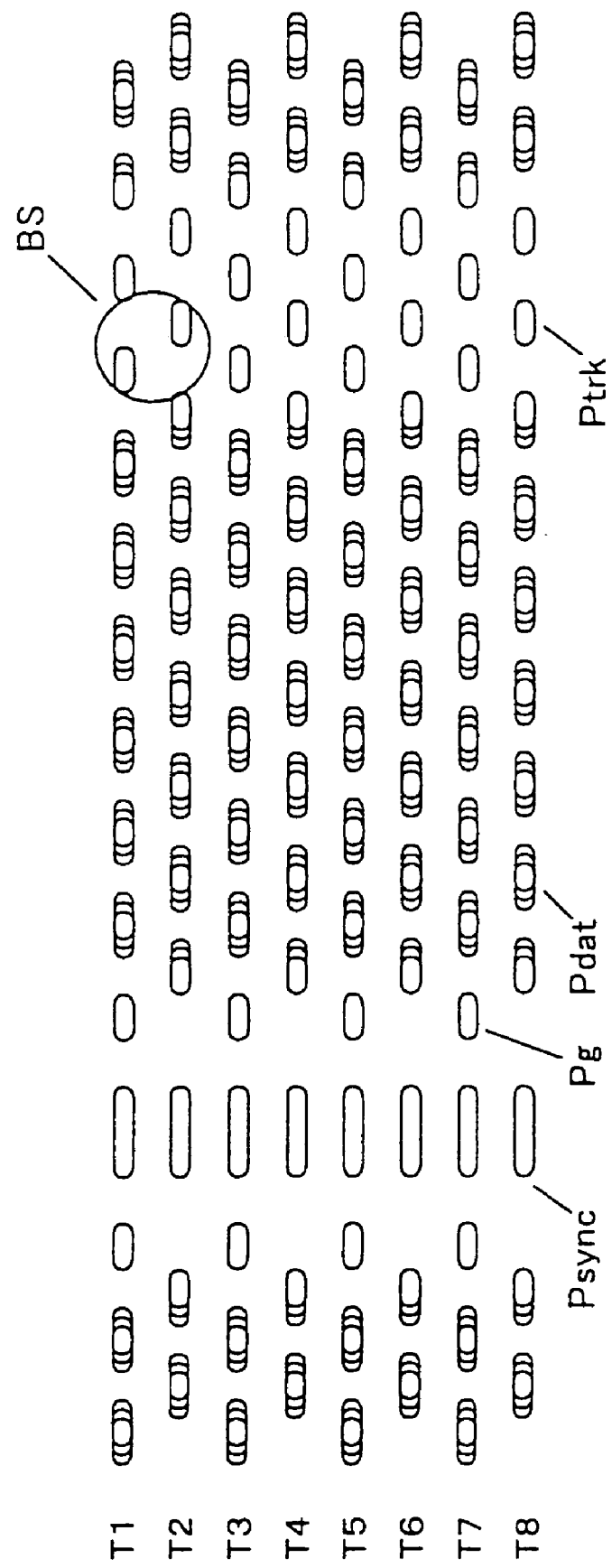
FIG. 8 shows a pit arrangement of an optical disk according to a first modified embodiment.

Next, FIG. 8 shows a pit arrangement of an optical disk according to a first modified embodiment. Two tracking pits Ptrk are formed continuously on a track. Other points are the same as the case shown in FIG. 1. According to this constitution, by detecting a plurality of the level differences between the samples corresponding to a center of respective tracking pits Ptrk, it is possible to average these level differences. Hereby, it is possible to increase a S/N ratio, so that more accurate tracking servo control can be carried out.

Figure 9:
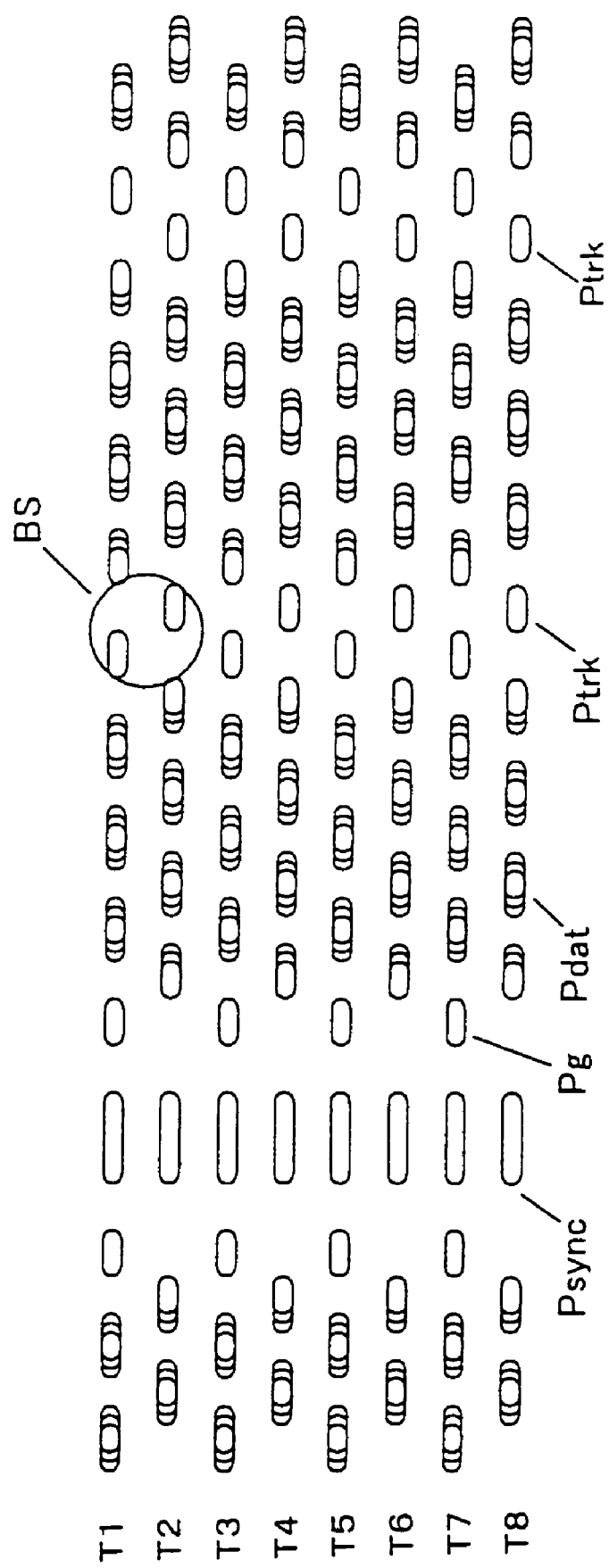
FIG. 9 shows a pit arrangement of an optical disk according to a second modified embodiment.

Next, FIG. 9 shows a pit arrangement of an optical disk according to a second modified embodiment. A plurality of tracking areas where the tracking pits Ptrk are arranged are provided in a single frame. Other points are the same as the case shown in FIG. 1. According to this constitution, by detecting a plurality of the level differences between the samples corresponding to a center of respective tracking pits Ptrk in respective tracking areas, it is possible to average these level differences. Hereby, it is possible to increase a S/N ratio, so that more accurate tracking servo control can be carried out.

Embodiment described above explains a case such that the present invention is applied to a system combining the pit edge multilevel recording system and the RPR reproduction. However, in addition to this, the present invention may be applied to a system combining the pit edge multilevel recording system and the two dimensional PRML reproduction (for example, it is disclosed in Japanese Patent Application Laid-Open No. 11-144250).

The entire disclosure of Japanese Patent Application No. 2001-5717 filed on Jan. 12, 2001 including the specification, claims, drawings and summary is incorporated herein by reference in its entirety.

What is claimed is:

1. An optical disk for recording digital data in accordance with a sampled servo system, the optical disk comprising a servo area and a data area, wherein
   - a synchronization mark for a synchronization signal is arranged in the servo area;
   - a plurality of information marks as the digital data and a tracking mark for a tracking signal are arranged in the data area;
   - the plurality of information marks comprise first information marks and second information marks; and
   - the tracking mark is located between the first and the second information marks and apart from the servo area.

2. An optical disk according to claim 1, wherein the tracking mark is located at a predetermined position in the data area.

3. An optical disk according to claim 1, wherein a mark row of the plurality of information marks and the tracking mark has the identical mark period.

4. An optical disk according to claim 1, wherein a mark row of the plurality of information marks and the tracking mark has a reverse phase between adjoining two tracks.

5. An optical disk according to claim 1, wherein a mark edge position of the plurality of information marks is changed in multi steps in response to information data; and
a mark edge position of the tracking mark is fixed.

6. An optical disk according to claim 1, wherein the tracking mark is arranged apart from a border between the servo area and the data area at an interval equivalent to a certain number of the plurality of information marks.

7. An optical disk according to claim 1, wherein a plurality of the tracking marks are continuously formed.

8. An optical disk according to claim 1, wherein a plurality of tracking areas where the tracking mark is arranged are dispersively provided in the data area.

9. An information reproducing apparatus for reproducing information from an optical disk, the optical disk comprising a servo area and a data area, wherein
   - a synchronization mark for a synchronization signal is arranged in the servo area; a plurality of information marks as the digital data and a tracking mark for a tracking signal are arranged in the data area;
   - the plurality of information marks comprise first information marks and second information marks located apart from the servo area; and
   - the tracking mark is located between the first and the second information marks, the information reproducing apparatus comprising:
   - a reader which irradiates a reproduction laser beam to the optical disk and generates a reproduction signal in response to intensity of reflection light from a beam spot on the optical disk;
   - an A/D converter which samples the reproduction signal in synchronization with a reproduction clock and converts it into a sample series;
   - a tracking error detector which extracts a plurality of samples corresponding to the tracking mark from the sample series and detects a tracking error; and
   - a tracking servo controller which controls the beam spot so that it scans a centerline of adjoining two tracks in response to the tracking error.

10. An information reproducing apparatus according to claim 9, wherein
the tracking error detector extracts two samples corresponding to a center of respective tracking marks of the adjoining two tracks and detects a level difference of the two samples as the tracking error.

* * * * *